United States Patent
Anconetani et al.

(10) Patent No.: US 7,120,153 B1
(45) Date of Patent: Oct. 10, 2006

(54) SYSTEM AND METHOD FOR CROSS CONNECTING AN ATM NETWORK AND A TELECOMMUNICATION SWITCH

(75) Inventors: Anthony H. Anconetani, Round Rock, TX (US); Robert H. Whitcher, Austin, TX (US)

(73) Assignee: GenBand, Inc., Austin, TX (US)

( * ) Notice: Subject to any disclaimer, the term of this patent is extended or adjusted under 35 U.S.C. 154(b) by 1060 days.

(21) Appl. No.: 10/140,716

(22) Filed: May 7, 2002

Related U.S. Application Data (60) Provisional application No. 60/289,420, filed on May 7, 2001.

(51) Int. Cl.
*H04L 12/28* (2006.01)

(52) U.S. Cl. ................ 370/395.4; 370/395.6
(58) Field of Classification Search ............ None
See application file for complete search history.

(56) References Cited

U.S. PATENT DOCUMENTS

| | | | |
|---|---|---|---|
| 5,999,518 A * | 12/1999 | Nattkemper et al. ...... 370/258 |
| 6,018,525 A * | 1/2000 | Sucharczuk .............. 370/394 |
| 6,526,046 B1 * | 2/2003 | Carew ..................... 370/352 |
| 6,577,631 B1 * | 6/2003 | Keenan et al. ............ 370/394 |
| 6,587,443 B1 * | 7/2003 | Dutta ..................... 370/322 |
| 6,944,153 B1 * | 9/2005 | Buckland et al. ......... 370/376 |
| 7,020,144 B1 * | 3/2006 | Chang .................... 370/395.6 |

FOREIGN PATENT DOCUMENTS

KR  2002052067 A  * 7/2002

* cited by examiner

*Primary Examiner*—Chirag Shah
*Assistant Examiner*—Phuongchau Ba Nguyen
(74) *Attorney, Agent, or Firm*—Baker Botts L.L.P.

(57) ABSTRACT

A method for cross connecting an ATM network and a telecommunication switch includes receiving ATM cells from the ATM network at a packet sorter and extracting data packets comprising address data and payload data from the ATM cells. Translated addresses are generated based on the address data, and new data packets are created based on the payload data and the translated addresses to create new ATM cells with the new data packets. The new ATM cells are scheduled to be transmitted from the packet sorter to an ATM switch in compliance with an ATM service contract. The new ATM cells are forwarded from the ATM switch to at least one distributed SAR, which converts the new ATM cells into TDM signals and transmits the TDM signals from to the telecommunication switch via at least one TDM port.

18 Claims, 8 Drawing Sheets

SYSTEM AND METHOD FOR CROSS CONNECTING AN ATM NETWORK AND A TELECOMMUNICATION SWITCH

RELATED APPLICATIONS

This application claims the benefit of U.S. Provisional Application Ser. No. 60/289,420 filed May 7, 2001.

TECHNICAL FIELD OF THE INVENTION

This invention relates in general to the field of telecommunications and more particularly to a system and method for cross connecting an ATM network and a telecommunication switch.

BACKGROUND OF THE INVENTION

Digital Subscriber Line (DSL) technology was initially deployed to provide data-only service as a alternative for slower-speed dialup modems. Incumbent Local Exchange Carriers (ILECs), Competitive Local Exchange Carriers (CLECs), and other telecommunication providers have begun to explore offering Voice over DSL (VoDSL) service to deliver integrated voice and data services.

A typical VoDSL system includes a gateway that interfaces with a telecommunication switch, such as a Class 5 switch on a Public Switched Telephone Network (PSTN), and an Integrated Access Device (IAD) at the customer premises. The gateway sends and receives digital signals in a Time-Division Multiplexed (TDM) format to and from the telecommunication switch and communicates with the IAD using Asynchronous Transfer Mode (ATM) cells. The IAD sends and receives telecommunications information, such as analog voice signals, to and from customer equipment, such as a telephone on a subscriber line.

Specifically, when receiving voice signals from a telephone, the IAD converts the voice signals into ATM cells and transmits the ATM cells to the gateway. Typically, the VoDSL system uses the ATM adaptation layer protocol known as AAL2 for the ATM cells, with the ATM cells transported to and from each IAD on an ATM Permanent Virtual Circuit (PVC). The gateway converts the ATM cells from the IAD into TDM signals and transmits the TDM signals to the telecommunication switch. Specifically, the TDM signals are typically sent to GR-303 Digital Signal (e.g., DS-0) channels in the telecommunication switch.

Gateways utilize cross-connect functionality to provide distribution paths between the PVCs and the DS-0s. Since the ATM PVCs are typically statically configured by a craft person while DS-0s are typically dynamically assigned by the Class 5 switch, the gateway must be able to dynamically connect any static AAL2 channel to any DS-0 within any GR-303 group.

A typical gateway utilizes a central Segmentation And Reassembly (SAR) module and a TDM switch to provide the cross-connect function. The central SAR module converts the ATM cells into TDM signals. The TDM switch cross-connects the TDM signals from the central SAR module to the appropriate DS-0 of the telecommunication switch via TDM ports. For communications from the telecommunication switch back to the customer equipment, the VoDSL system uses generally the reverse of the operations described above.

Using ATM cells rather than conventional TDM protocols allows for more effective and efficient use of bandwidth between the customer premises and the telecommunication switch. A disadvantage associated with the typical VoDSL system, however, is that it requires a TDM switch to cross-connect the central SAR with the TDM ports. That requirement increases the cost of the system.

Another disadvantage relates to the capacity of conventional central SARs. Providers of telecommunication services desire a VoDSL gateway with the capacity to handle over 3000 simultaneous calls and 10:1 over-subscription. This approximates the bandwidth of two Optical Carrier-3 (OC-3) channels, or approximately 50,000 connections. Current AAL2 central SARs, however, only support 1023 simultaneous calls and connections. Conventional VoDSL systems are therefore incapable of providing the desired capacity.

SUMMARY OF THE INVENTION

From the foregoing, it may be appreciated by those skilled in the art that a need has arisen for cross connecting an ATM network and a telecommunication switch. In accordance with the present invention, a system and method for cross-connecting an ATM network and a telecommunication switch is provided that substantially eliminates or reduces disadvantages or problems associated with previously developed systems and methods.

According to an embodiment of the present invention, there is provided a method for cross connecting an Asynchronous Transfer Mode (ATM) network and a telecommunication switch. In the method ATM cells are received at a packet sorter. Data packets that include address data and payload data from the ATM cells are extracted. Translated addresses based on the address data are generated. New data packets based on the payload data and the translated addresses are created. New ATM cells are created with the new data packets. The new ATM cells are scheduled to be transmitted in compliance with an ATM service contract from the packet sorter to an ATM network. The new ATM cells are forwarded from the ATM network to a destination Integrated Access Device.

Technical advantages of the present invention include the elimination of extra switching hardware, such as the TDM switch, and simplification of the gateway SAR implementation. The resulting system may be less expensive, easier to implement, more energy efficient, or able to be brought to market more rapidly. Other technical advantages may be readily ascertainable by those skilled in the art from the following description, figures, and claims which further describe the present invention including its features, functions, and technical advantages.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a block diagram of an illustrative gateway system for cross connecting an Asynchronous Transfer Mode (ATM) network and a telecommunication switch;

FIG. 2 illustrates a block diagram of a gateway system with a central Segmentation and Reassembly (SAR) module and a Time-Division Multiplexed (TDM) switch;

FIG. 3 illustrates a block diagram of a gateway system with a packet sorter and distributed SAR modules;

FIG. 4 illustrates a block diagram of the packet sorter of the gateway sorter;

FIG. 5 illustrates a block diagram of a gateway system with an Integrated Access Device (IAD), packet sorter, and ATM switch;

FIG. 6 graphically illustrates an ATM data packet stream and an inverse Peak Cell Rate;

FIG. 7 illustrates a block diagram of components of a gateway system in one embodiment of the present invention;

FIG. 8A graphically illustrates a first ATM data stream being communicated on a first virtual circuit;

FIG. 8B graphically illustrates a second ATM data stream being communicated on a second virtual circuit;

FIG. 8C graphically illustrates a combined ATM data stream being communicated on a virtual circuit;

FIG. 9A illustrates line rate bursts resulting from active CID data packet merges;

FIG. 9B illustrates integrated derived voice VC-level traffic shaping and link scheduling;

FIG. 10 illustrates a block diagram of an Access Network Module in the gateway system;

FIG. 11 illustrates an ESI Scheduler block diagram;

FIG. 12 illustrates a parameter validity test with a finite length time variable;

FIG. 13 illustrates an ESI Scheduler process block diagram; and

FIG. 14 illustrates a parameter propagating through the ESI scheduler.

DETAILED DESCRIPTION OF THE INVENTION

Figure 1:
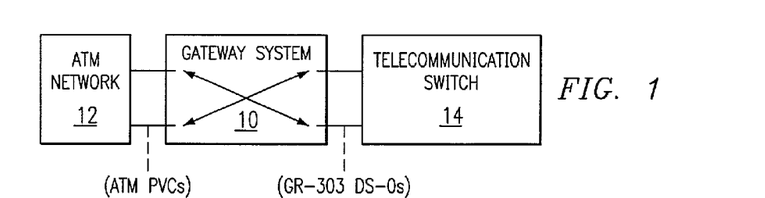

The present invention relates to an improved system and method for cross connecting an Asynchronous Transfer Mode (ATM) network and a telecommunication switch. FIG. 1 depicts an illustrative embodiment of the present invention featuring a gateway system 10 that cross connects an ATM network 12 and a telecommunication switch 14. System 10 provides cross connect functionality to communicate telecommunication information between Permanent Virtual Circuits (PVCs) in ATM network 12 and Digital Signal channels (DS-0s) in telecommunication switch 14.

Referring to FIG. 1, telecommunication switch 14 may be a switch in a telecommunication network such as a Public Switched Telephone Network (PSTN), a private switched telephone network, or any other interconnected collection of telecommunication switches that provide local, long distance, or international telephone service. Telecommunication switch 14 may be a Class 4 switch, a Class 5 switch, or any other suitable switch for communicating telecommunication information between a telecommunication network and system 10. In a particular embodiment the components of system 10 are contained within a chassis located in a central office, remote terminal, or other telecommunication site, and ATM network 12 includes twisted pair lines that carry the telecommunication information between system 10 and Integrated Access Devices (IADs) at customer premises. In the illustrated embodiment telecommunication switch 14 and system 10 communicate telecommunication information using a GR-303 protocol. Alternative embodiments, however, support other protocols such as TR-08, Signal System 7 (SS7), V5, Integrated Services Digital Network (ISDN), unbundled analog lines, or any other suitable interface. Telecommunication information may include voice, data, image, video, or any other type of information that may be communicated over a telecommunication network. While the present invention will be described in terms of AAL2-format ATM packets, other formats of ATM cell packets are envisioned within the scope of the present disclosure.

Figure 2:
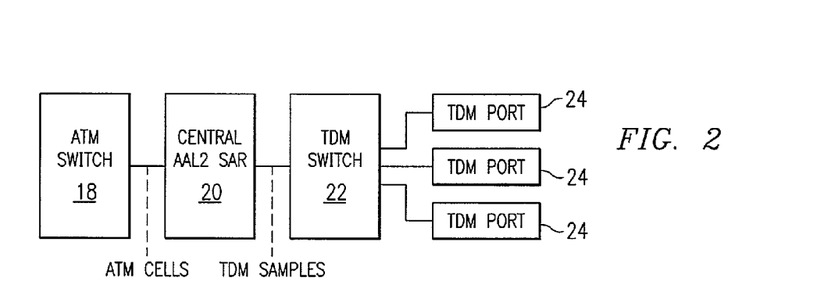

FIG. 2 depicts a traditional gateway system 16 with an ATM switch 18, a central Segmentation and Reassembly (SAR) module 20, a Time-Division Multiplexing (TDM) switch 22, and a plurality of TDM ports 24 as is known in the prior art. ATM switch 18 directs ATM cells to central SAR module 20. Central SAR module 20 converts voice samples from ATM Adaption Layer 2 (AAL2) format ATM cells to TDM signals. Once the voice signals are in TDM format, central SAR module 20 transmits the voice samples to TDM switch 22. TDM switch 22 cross connects the TDM voice samples from central SAR module 20 to the correct DS-0 on the correct TDM Port 24.

Figure 3:
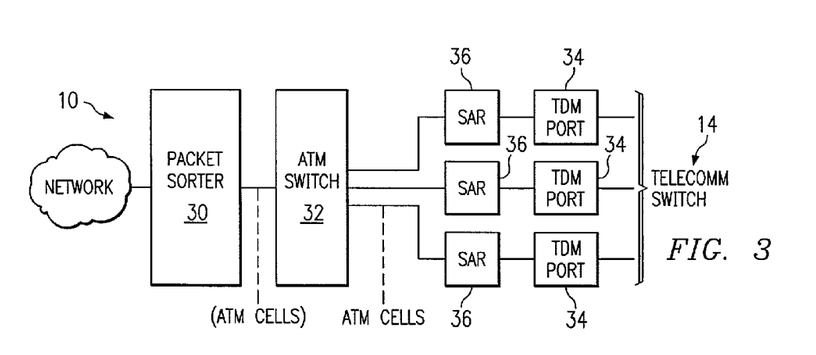

FIG. 3 depicts gateway system 10 of FIG. 1 in greater detail. System 10 is a gateway system that does not utilize a TDM switch or a central SAR module, but instead uses a packet sorter 30, an ATM switch 32, and distributed SAR modules 36 to cross connect telecommunication information between PVCs in ATM network 12 and DS-0s in telecommunication switch 14. Packet sorter 30 is situated between ATM switch 32 and ATM network 12. Distributed SAR modules 36 are situated between ATM switch 32 and TDM ports 34 and are distributed through system 10. In the illustrated embodiment of the present invention, each distributed SAR module 36 is placed near one corresponding TDM port 34. In other embodiments, however, various arrangements of SAR modules 36 distributed relative to the TDM ports 34 are envisioned.

As described below in greater detail, packet sorter 30 receives AAL2-format ATM cells containing voice signals from ATM network 12, packages the voice signals into Common Part Sub-layer (CPS) packets, and re-packages the CPS packets into new AAL2-format ATM cells. The conversion of AAL2-format ATM cells to CPS packets is known as a partial SAR-ing process. Specifically, the AAL2-format ATM cells are not fully converted into TDM signals. Rather, they are only converted into CPS packets as an intermediate format. Packet sorter 30 directs the new ATM cells into ATM switch 32, and ATM switch 32 is operable to distribute the ATM cells to distributed SAR modules 36. The distributed SAR modules 36 convert the ATM cells to TDM signals and forward the TDM signals to telecommunication switch 14 via TDM ports 34. For communications from the telecommunication switch to the ATM network, system 10 uses generally the reverse of the above-described operations.

System 10 thus uses an ATM switch, rather than a TDM switch, to cross connect telecommunication information between ATM network 12 and telecommunication switch 14. Therefore, no TDM switch is required. By contrast traditional gateway architectures that are known in the art, like the one depicted in FIG. 2, send all of the packetized voice signals to a central or common SAR. The common SAR de-packetizes the voice signals to generate TDM-format signals and is operable to send the TDM-format signals to a TDM switch. The TDM switch then directs the voice samples to the correct location in architectures in the prior art.

In one embodiment of the present invention, however, as illustrated in FIG. 3, the voice signals remain in packets, namely CPS-protocol Service Data Units (CPS-SDUs). The voice packets are directed from one ATM Virtual Circuit (VC) flow to a new VC flow. The new VC flow carries the packetized voice through the ATM switch 32 to the correct location. Since the voice samples stay packetized until the final destination, the TDM switching structure can be eliminated and ATM switch 32 may be reused. As a result a voice gateway may be provided at a lower cost or with lower power requirements.

Figure 4:
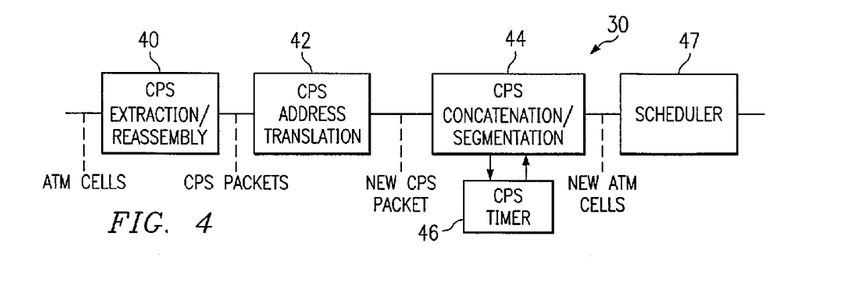

FIG. 4 depicts packet sorter 30 in greater detail. As shown, packet sorter 30 includes a CPS extraction/reassembly module 40, a CPS address translation module 42, a CPS concatenation/segmentation module 44, a CPS timer 46, and a scheduler 47. In the illustrative embodiment, packet sorter 30 operates generally like the AAL2 switching node described and depicted in FIG. 3 of "Performance Evaluation of AAL2 Switching Networks" by Hiroshi Saito, as published by the Institute of Electronics, Information and Communication Engineers (IEICE) Trans. Commun., Vol. E82-B, No. 9 Sep. 1999, pages 1411–23.

With regard to the illustrative embodiment, CPS extraction/reassembly module 40 removes CPS packets from the ATM cells (otherwise known as CPS Service Data Units or CPS-SDUs). If a CPS packet spans multiple ATM cells, CPS extraction/reassembly module 40 reconstructs the CPS packet from the multiple ATM cells. CPS address translation module 42 then determines a new Channel Identifier (CID) and new VC flow for the CPS payload. Each CPS packet includes a component that identifies the intended destination for the data contained within the packet, referred to as a Channel Identifier (CID). CPS address translation module 42 may consider the Physical specifications (PHY), Virtual Path Identifier (VPI), Virtual Channel Identifier (VCI) or CID on which the CPS payload was received. These values are used to determine the new C ID and VC flow. CPS address translation module 42 also generates a correct CPS Header Error Control (CPS-HEC), CPS-LI, and CPS User-to-User Identification (CPS-UUI) for the CPS Header. CPS address translation module 42 may use a lookup table for address translation.

CPS concatenation/segmentation module 44 is operable to place CPS packets into new ATM cells. If a CPS packet is too long to be placed in the current ATM cell, CPS concatenation/segmentation module 44 is operable to split the CPS packet, filling the present ATM cell and placing the remainder in the next ATM cell. CPS concatenation/segmentation module 44 may use RAM storage when building the new ATM cells. New ATM cells are provided to scheduler 47 for transport back to ATM Network 12.

CPS timer module 46 is operable to prevent excessive timing delays among the CPS packets. When CPS concatenation/segmentation module 44 places a CPS packet into a new ATM cell, CPS timer module 46 starts a timer for that ATM cell. If the timer expires before the ATM cell is completely filled, CPS timer module 46 may instruct CPS concatenation/segmentation module 44 to fill the rest of the ATM cell payload with zeros and transmit the ATM cell. CPS timer module 46 contains a bank of real time counters (not shown), wherein one counter may be dedicated to each active VC flow.

Figure 5:
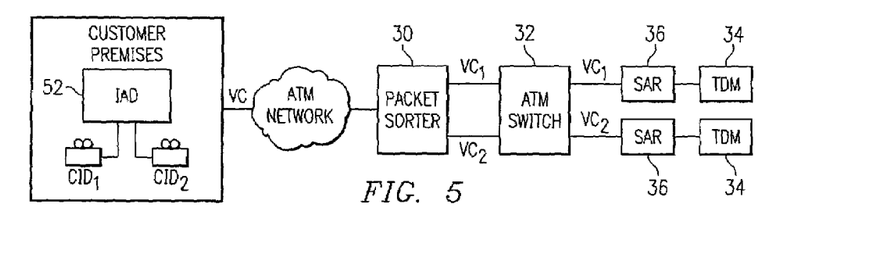

Referring now to FIG. 5, wherein an exemplary embodiment of the present invention is illustrated, there is shown an Integrated Access Device (IAD) 52 at a customer location that supports at least one piece of customer telecommunication equipment, which may include such examples as telephones, personal computers, or facsimile machines. While FIG. 5 illustrates a customer with two pieces of telecommunication equipment, $CID_1$ and $CID_2$, the system and method of the present invention is operable for any number of pieces of telecommunication equipment. IAD 52 communicates information from the customer telecommunication equipment with gateway system 10 by way of a VC through an ATM network. In this exemplary illustration the VC is located in an ATM network and utilizes the ATM Adaption Layer 2 (AAL2) protocol to provide Loop Emulation Service (LES). The ATM cells within VC include CPS packets associated with each active piece of telecommunication equipment. The CPS packets for the two exemplary pieces of telecommunication equipment have different CID values: for example, $CID_1$ for telecommunication equipment 1 and $CID_2$ for telecommunication equipment 2.

When packet sorter 30 receives ATM cells from IAD 52 on the VC, packet sorter 30 extracts the CPS packets from each ATM-format cell and examines the CID associated with each CPS packet. New ATM cells are built with the CPS packets that have matching CIDs, and different VCs for each of the CIDs are then used to forward the new ATM cells to ATM switch 32. One embodiment of the present invention as illustrated in FIG. 5 shows that ATM cells with CPS packets with $CID_1$ are communicated on $VC_1$, while ATM cells with CPS packets with $CID_2$ are communicated on $VC_2$. ATM switch 32 then distributes the ATM cells from $VC_1$ and $VC_2$ to the appropriate SAR 36 for conversion to TDM-format signals at TDM port 34. Thus, in this implementation packet sorter 30 splits each CID channel into its own VC. In alternative embodiments, packet sorter 30 may split packets into different VCs based on other fields that indicate destination, such as the Virtual Path (VP) or Physical (PHY) fields. Substantially the reverse of the above operations are performed on telecommunication information flowing in the other direction. Thus, instead of taking multiple CIDs on multiple VCs and performing a fan out operation, a merge operation is performed in the other direction. This method of cross connecting may be referred to as CID-switching.

Communications across an ATM network are subject to requirements that are set out in service contracts. Among the requirements set forth in the service contracts are a Peak Cell Rate (PCR) and Sustained Cell Rate (SCR). In order for the above-described method of cross connecting an ATM network and a telecommunication switch using CID-switching to have practical application, therefore, the CID-switching method must further communicate that it is in compliance with the service contract requirements. Formatting a communication stream to ensure compliance with a service contract is also known as shaping the stream. Stated another way, it is desirable for gateway system 10 to be operable to both shape and oversubscribe into ATM network 12.

Figure 6:
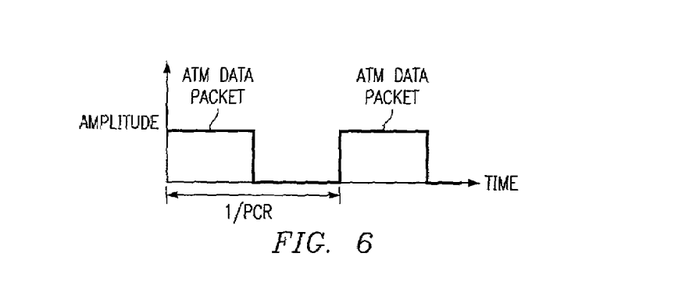

FIG. 6 graphically illustrates one such requirement from an ATM service contract. The PCR defined in the service contract establishes a maximum rate that ATM data packets that may be transmitted on the ATM channel. Accordingly, the inverse, or 1/PCR, defines the minimum spacing between leading edges of ATM data packets required under the service contract.

Figure 7:
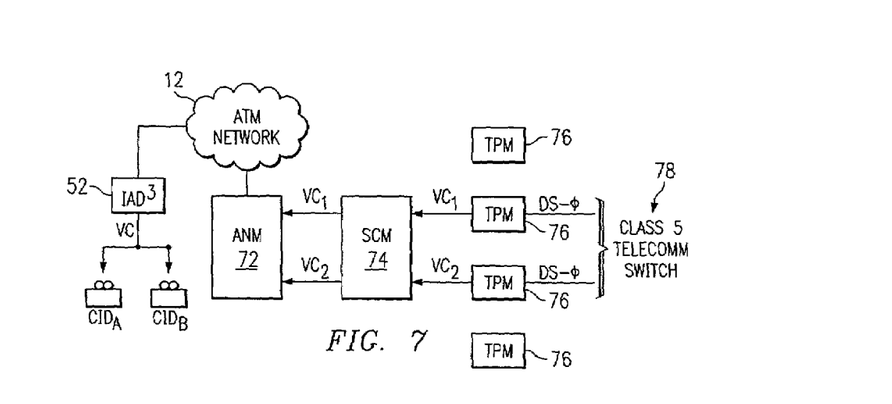

Referring now to FIG. 7, there is illustrated an embodiment of the present invention including such components as an Access Network Module (ANM) 72, a System Controller Module (SCM) 74, as well as a plurality of Telephony Port Modules (TPMs) 76. Voice information such as that from a Class 5 telecommunication switch 78 is intended for customer telecommunication equipment, identified in FIG. 7 as $CID_1$ and $CID_2$. Information is passed along a DS-0 path from a telecommunication switch 78 until reaching a TPM card 76. The TPM 76 is operable to determine the intended destination for information carried by the DS-0. The destination is indicated by a CID that is associated with each signal. The TPM 76 receives the Time-Division Multiplexed (TDM) formatted telephone signals in a communications link such as a DS-0, converts the signal into AAL2-format ATM packets, and is further operable to communicate these ATM packets on a Virtual Circuit (VC). TPM 76 also associates a Channel Identification (CID) number with information bound for a specific piece of customer telecommunication equipment. The VCs pass the ATM packets to SCM 74, which passes the ATM packets on to ANM 72. ANM 72 then schedules the ATM cells for transport over ATM network 12 and eventually to an appropriate customer telecommunication equipment through IAD 52. In a method to be described in further detail below, ANM 72 is operable to combine the ATM data packet information from the multiple incoming VCs into one ATM VC.

Figure 8A:
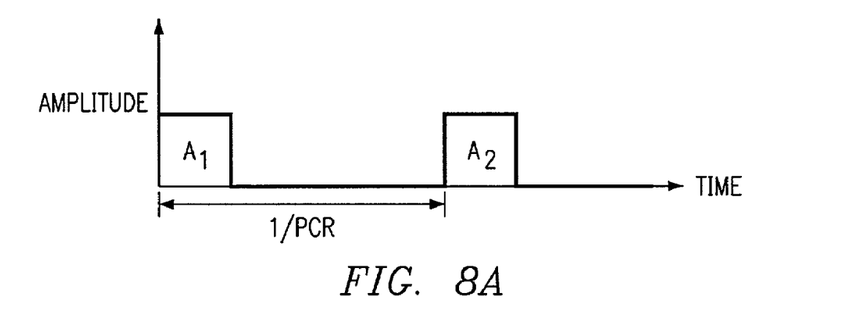
Figure 8B:
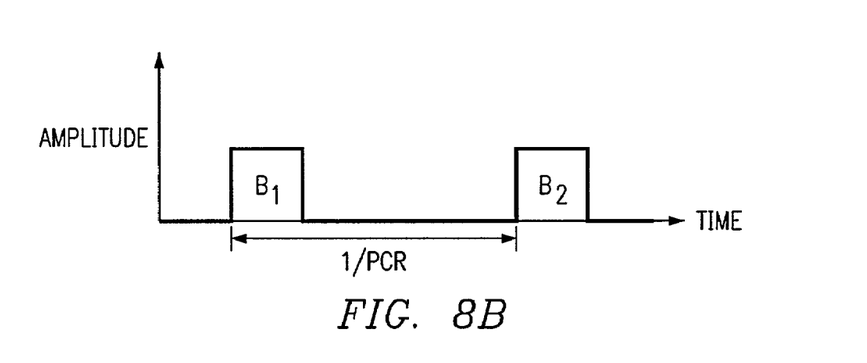

FIG. 8A graphically illustrates an example of a data packet stream communicated by $VC_1$ into ANM 72. Conditions set forth in the ATM service contract dictate some of the characteristics of the data stream. The inverse of the Peak Cell Rate (1/PCR) provides the minimum time that must elapse between the leading edges of adjacent data packets. Similarly, FIG. 8B graphically illustrates an example of a data packet stream communicated by $VC_2$ into ANM 72.

Figure 8C:
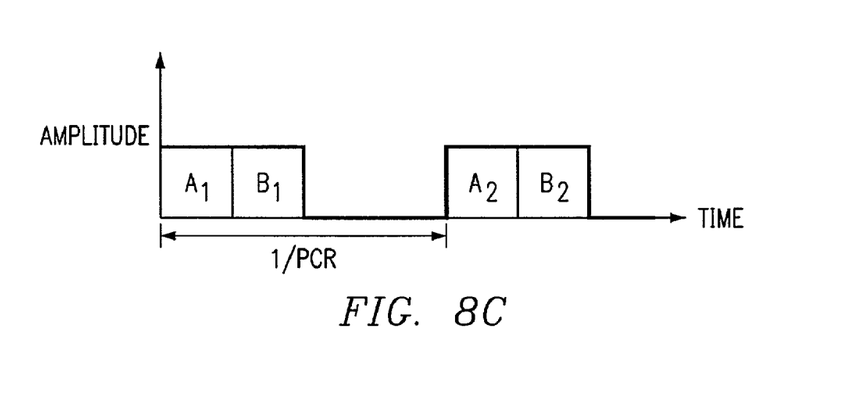

Turning now to FIG. 8C, an example of a potential combined data packet stream communicated by ATM VC after passing through ANM 72 is graphically illustrated. When the data stream from $VC_1$ is combined with the data stream from $VC_2$, a data stream results that is in violation of the Peak Cell Rate. Packet $B_1$ is transmitted within the 1/PCR period of packet $A_1$. The graph of FIG. 8C illustrates the problematic concept referred to in the art as bursting, wherein the combination of multiple VCs into one ATM VC results in a data stream that violates the ATM service contract. Accordingly, a method is required to combine the multiple data streams in a manner such that the ATM Peak Cell Rate is not violated.

Figure 9A:
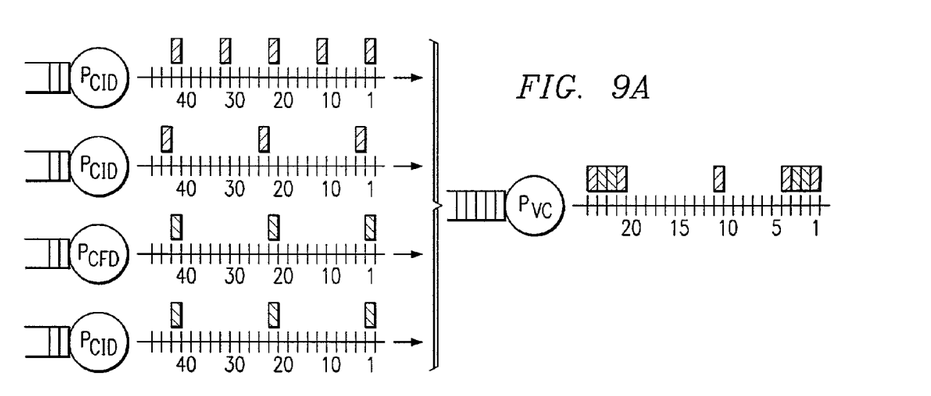
Figure 9B:
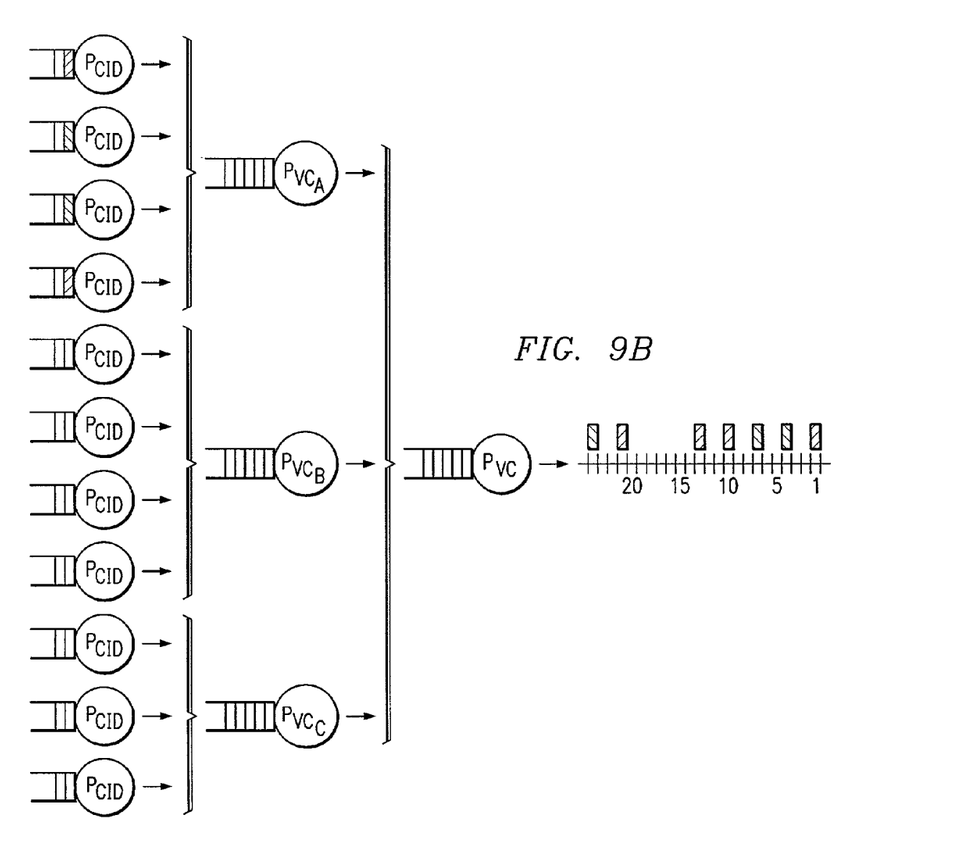

Referring now to FIG. 9A, there is illustrated the scenario of four CIDs attempting to merge data packets onto one VC path. The line rate bursts on the VC will violate the ATM service contract. FIG. 9B illustrates VC-level traffic shaping and link scheduling according to one embodiment of the present invention. Data packets from a plurality of CIDs are combined into VC-level traffic aggregates. These aggregates are then merged using PCR limiting requirements so that no bursting results violate the ATM service contract. Both traffic shaping and link scheduling are used to space data packets on the VC.

Figure 10:
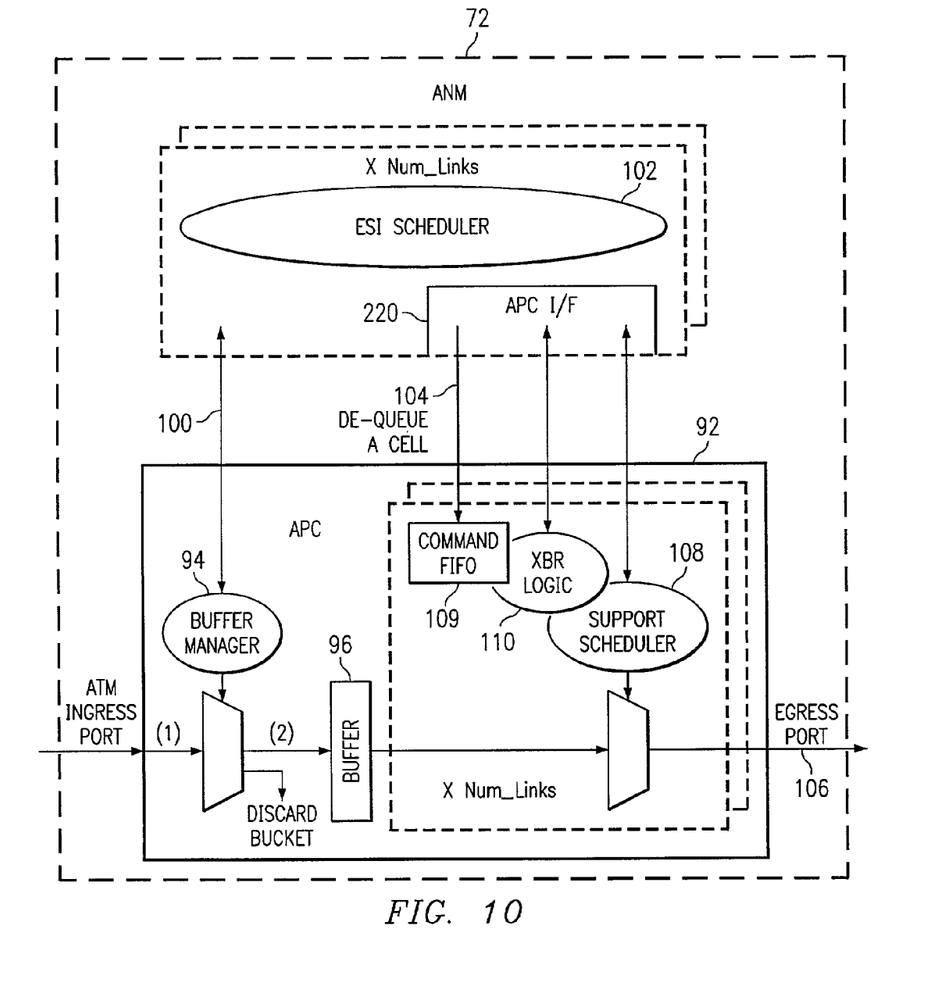

FIG. 10 depicts ANM 72 of FIG. 7 in greater detail. ANM 72 is the physical interface to ATM network 12. First, a data packet, or ATM cell, from a VC enters ANM 72. ANM 72 is operable to process the cell. In an exemplary embodiment of the invention, ANM 72 processes the cell by receiving the cell at an ATM Port Controller (APC) 92. APC 92 provides a buffer management function, cell buffers, and per link scheduling for internally scheduling traffic. APC 92 also provides logic for merging externally scheduled traffic with internally scheduled traffic. Upon entering the ingress side of APC 92, a buffer manager 94 is operable to determine if there is adequate space in VC buffer 96 to store the ATM cell. If there is storage room, the cell is passed to buffer 96. If, however, there is no room in buffer 96, the cell is discarded. Once a cell is in buffer 96, buffer manager 94 will not try to remove the cell.

Buffer manager 94 is further operable to communicate with a Cell Scheduler 102 Transmit Bus 100. Cell Scheduler 102 is operable to schedule cells on VCs that have been designated for external scheduling. Cell Scheduler 102 is connected to APC 92 via an APC Interface 220. In one embodiment of the present invention, Cell Interface 220 is a 50 MHz, 16-bit interface leaving APC 92 and APC Interface 220 is a 100 MHz, 8-bit bus entering APC 92. In one embodiment of the present invention, Cell Scheduler 102 is located external to the APC 92. However, in other embodiments the scheduling function of ESI Scheduler 102 could take place within APC 92 itself. Every 680 nanoseconds (or the time required for one cell during OC-12 protocol communication), APC 92 reports to the Cell Scheduler 102 what happened in APC 92 during the previous cell time. It is further disclosed that other APCs 92, while varying from the above description in certain timing or other specifics, would also function adequately within the present invention and are envisioned to do so. Four potential events can occur in APC 92: Ingress En-queue, Ingress De-queue, Egress En-queue, and Egress De-queue. By way of example when a cell arrives and is en-queued, buffer manager 94 of APC 92 reports over Transmit Bus 100 that a cell was en-queued. A unique identifier for the VC and other telemetry may also be passed between APC 92 and Cell Scheduler 102.

If buffer manager 94 decides to discard the cell, Cell Scheduler 102 does not schedule the cell. If buffer manager 94 decides to keep the cell, however, Cell Scheduler 102 is operable to schedule the cell for release from buffer 96 at some time in the future. Various mathematical algorithms may be used to enable Cell Scheduler 102 to time the release of a cell in buffer 96 to avoid the bursting problem and permit compliance with the appropriate ATM service contract. Cell Scheduler 102 issues a command to de-queue the cell from buffer 96 via de-queue Bus 104. APC 92 responds to the command to de-queue in one of three ways. First, APC 92 may acknowledge the command from Cell Scheduler 102 and inform Cell Scheduler 102 that APC 92 is ready for another command. This response informs Cell Scheduler 102 that Egress Port 106 is not back-pressured. Back-pressure refers to a condition wherein APC 92 is unable to accept additional data into a Subport Scheduler 108 until cells are de-queued and sent out of Egress Port 106. When Cell Scheduler 102 determines that it must send the command to de-queue a cell, it issues a de-queue command. APC 92 is operable to respond during the next cell time. Since there is latency in the response of APC 92, Cell Scheduler 102 should send the command to de-queue a cell whenever back-pressure is not asserted. When APC 92 actually sends a cell, APC 92 will inform Cell Scheduler 102. Cell Scheduler 102 can then issue another de-queue command. Cell Scheduler 102 should again continue to issue de-queue commands until back-pressure is asserted.

In a second alternative, APC 92 may respond to the command from Cell Scheduler 102 by acknowledging the command but informing Cell Scheduler 102 not to send another command. This response indicates to Cell Scheduler 92 that Egress Port 106 is now back-pressured. In a third possible response, APC 92 does not acknowledge the command from Cell Scheduler 102. This informs Cell Scheduler 102 that Egress Port 106 is currently back-pressured and Cell Scheduler 102 should re-send the command at a later time.

When the command from Cell Scheduler 102 for APC 92 is accepted, the command is put into a command First In, First Out (FIFO) buffer 109 inside APC 92. APC 92 holds the command until Subport Scheduler 108 is ready to service command FIFO buffer 109. Command FIFO buffer 109 and the command back-pressure mechanism allow the Cell Scheduler scheduled traffic to merge with the rest of the APC-scheduled traffic. When Subport Scheduler 108 sends the Cell Scheduler -scheduled cell, transport logic 110 is operable to inform Cell Scheduler 102 that the cell has been transmitted.

The above-described system constitutes what may be referred to as an ATM-shaper, because it is operable to take in multiple ATM data stream sources, queue them in a buffer, and then empty the queue into a single ATM data stream at a rate that satisfies the service contract requirements for the ATM network. It may occur that different VCs could be subject to the terms of different ATM service contracts. Cell Scheduler 102 is operable to comply with the most-restrictive ATM service contract and de-queue data packets from buffer 96 according to its terms so that the single VC-generated stream complies with all service contracts. The 1/PCR setting within Cell Scheduler 102 is dynamic, meaning that it may be altered or adjusted as necessary. Additionally, Cell Scheduler 102 may be configured to de-queue packets from buffer 96 according to the Sustained Cell Rate (SCR) from the ATM service contract. While the SCR corresponds to an average data stream rate, or Constant Bit Rate (CBR), utilizing the PCR permits over-subscription of the link.

Figure 11:
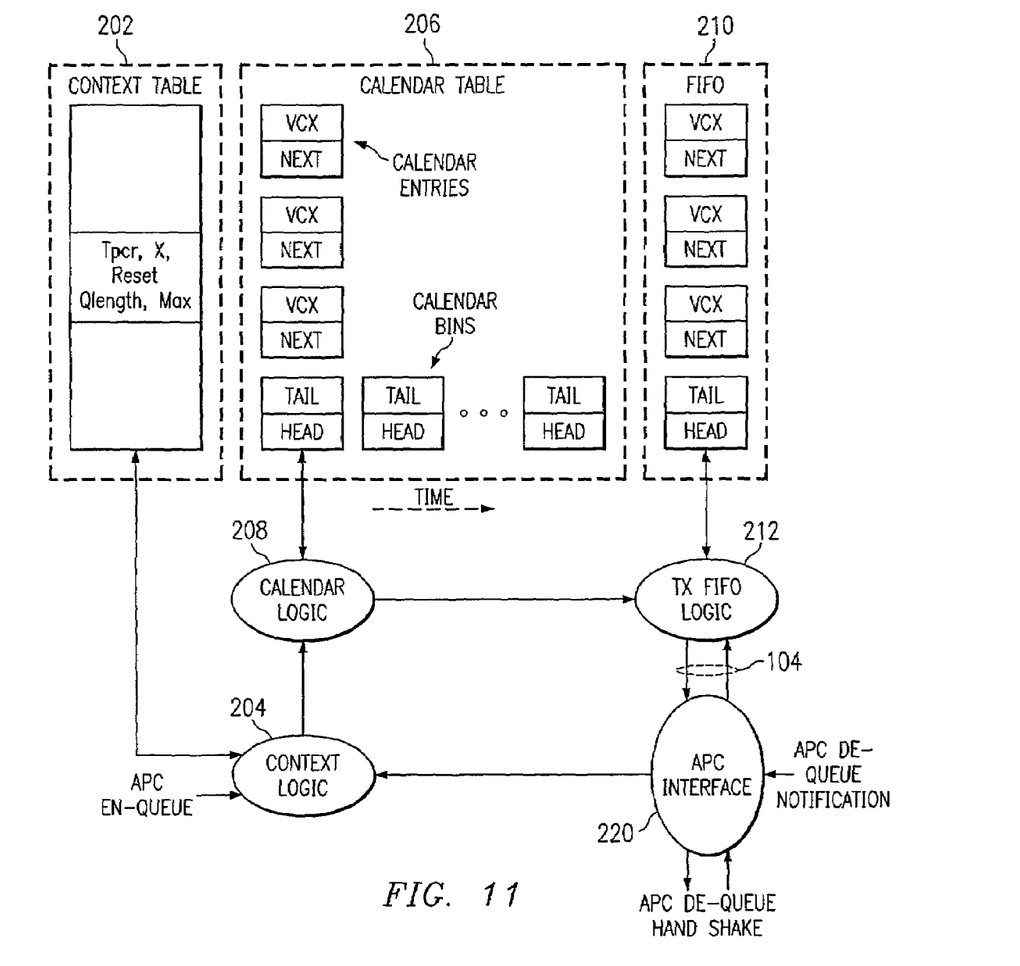

FIG. 11 illustrates one embodiment of Cell Scheduler 102 that includes a Context Table 202, a Context Logic 204, a Calendar Table 206, a Calendar Logic 208, a FIFO buffer 210, and a FIFO Logic 212. Calendar Table 206 is an array of link lists. Each array element is referred to as a calendar bin, and each element in the link list in the calendar bin is referred to as a calendar entry. Each calendar bin represents a conformance time, which is a time when a cell can be sent in conformance with the ATM service contract. The dynamic link list allows any number of cells to share the same conformance time. Calendar Logic 208 maintains a counter that represents time. As the counter increases, calendar bins and their associated calendar entries become conformant, or ready to transmit.

FIFO Buffer 210 is a dynamic link list of calendar entries that are ready to be sent. As Calendar Table 206 time increments, Calendar Logic 208 grabs an entire calendar bin and passes it to FIFO Logic 212. FIFO Logic 212 appends the calendar bin to FIFO Buffer 210. FIFO Buffer 210 fills at an average rate determined by the time counter of Calendar Table 206 and the amount of traffic in Calendar Table 206. An APC Interface 220 empties FIFO Buffer 210 at a rate allocated by APC 92. FIFO Buffer 210 represents an effective rate domain crossing between Cell Scheduler 102 and APC 92.

Context Table 202 contains VC context information (VCX). Specifically, Context Table 202 contains the minimum period ($T_{PCR}$, where $1/T_{PCR}$ is the peak rate) of the connection. Context Table 202 also contains the current leaky bucket state (X), a reset on arrival flag (Reset), the current queue length in APC 92 (Qlength) and the maximum number of simultaneous calendar entries in Calendar Table 206 and FIFO Buffer 210 (Max).

The operation of Cell Scheduler 102 under light loading conditions will now be considered. All connections assigned to Cell Scheduler 102, which are the connections appearing in Context Table 202, are idle. In this state there are no calendar entries in Calendar Table 202 or FIFO Buffer 210. All connections have no credits in their leaky buckets.

When APC 92 receives a cell that must be scheduled, APC 92 informs Cell Scheduler 102 of the cell arrival by sending an en-queue notification over ESI Bus 104. APC 92 then receives another cell for the same connection so quickly that the second cell exceeds the peak rate for the connection, or stated another way, the cell inter-arrival time is less than $T_{PCR}$. For the first cell Context Logic 204 interrogates Context Table 202 and determines that the cell is conformant. This calculation will be described below in greater detail. Context Logic 204 issues a command to Calendar Logic 208 to schedule the cell for transmission. The command parameters are $VC_1$ Subport, and conformance time (or calendar bin). Context Logic 208 also increments the Qlength parameter, which is a bookkeeping variable that tracks the number of cells in APC 92.

Calendar Logic 208 receives the command from Context Logic 204 and places the VCX parameter into a calendar entry. Calendar Logic 208 appends the calendar entry onto the calendar bin that represents the correct conformance time. If the cell is placed into a calendar bin that is currently pointed to by the timer value of Calendar Logic 208, the cell is immediately transmitted. In this example the cell would be scheduled for immediate transmission.

For the second cell Context Logic 204 again examines Context Table 206. Upon running the leaky bucket conformance calculation (to be discussed below in greater detail), Context Logic 204 determines that the second cell is non-conformant. As such, the cell is scheduled into the future so as to be conformant. The distance into the future is a direct function of $T_{PCR}$ for the connection. After determining the conformance time, Context Logic 204 requests Calendar Logic 208 to schedule the second cell.

When Calendar Logic 208 ratchets to a new calendar bin, the contents of the calendar bin are passed to FIFO Logic 212. FIFO Logic 212 appends the calendar bin to FIFO Buffer 210. At some point the Calendar Logic timer value points to the calendar bin container bin containing the first cell, and the cell is moved to the transmit FIFO 109. At the next opportunity APC Interface 220 issues a command to APC 92 to ask it to de-queue the first cell on the now active connection, which is designated by VCX. APC 92 immediately responds with an acknowledgement of the command. APC Interface 220 issues a notification to decrement the Qlength variable in Context Table 202. For the second cell Calendar Logic 208, FIFO Logic 212, APC Interface 220, and Context Logic 204 all behave in a similar manner.

The operation of Cell Scheduler 102 under heavy loading conditions will now be considered. During light loading conditions, the variable Max in Context Table 202 was not used. Max represents the maximum number of cells that a given connection may have in Calendar Table 206 and FIFO Buffer 210. A connection may feed cells into APC 92 faster than APC 92 can empty them if the APC link is congested or Calendar Table 206 is oversubscribed. The connection then starts to develop a backlog and Qlength starts to increase. On any given cell arrival, Context Logic 204 checks to see if Qlength is less than Max. If so, Context Logic 204 can calculate a new conformance, update the leaky bucket state, and issue a schedule command to Calendar Table 206. If Qlength is greater than Max, then the connection has inserted the maximum number of cells in Calendar Table 206 and Context Logic 204 can only increment Qlength. As APC 92 de-queues cells, then Context Logic 204 must again look at Qlength relative to Max. If Qlength is less than Max, then Context Logic 204 realizes it has an opportunity to issue a new schedule command to Calendar Logic 208. If Qlength is greater than Max, then the de-queue notification only triggers a decrement of Qlength.

The Max parameter is a form of weighting. Higher rate connections should have a higher Max value. This allows higher rate connections to have more cells scheduled in Calendar Table 206. During congestion periods, Max results in more opportunities to send cells on the congested link. As was described above Calendar Logic 208 transfers entire calendar bins to FIFO Buffer 210 every time period. When APC Interface 220 is not back pressured by APC 92, APC Interface moves a cell from FIFO Buffer 210 to APC 92. In effect, FIFO Buffer 210 is the crossing point between two rate domains. One domain is the clock domain defined by the calendar bin time, and the other domain is the rate domain defined by APC 92. If the average number of cells per calendar bin is greater than the cell rate of APC 92, then a backlog of cells will begin to accumulate in FIFO Buffer 210. This is a normal operating scenario for a gateway system 10. ATM links will likely be provisioned with some finite probability that more subscriber phones will be active than the links can handle. In this case APC 92 will be en-queuing more data packet traffic than it is de-queuing.

At times the sum of the sustained bandwidths of the active VCs is greater than the service rate for the externally scheduled class in APC 92. In this situation compliant cells on different connections are scheduled into the calendar bin that is pointed to by the Calendar Table time value. Furthermore, non-conformant cells are being scheduled by the de-queuing of cells of the same connection. Even though the non-conforming cells may have originally arrived too quickly, the congestion on the link causes these originally non-conformant cells to become conformant. As a result, these once non-conformant cells enter Calendar Table 206 at the calendar bin pointed to by the Calendar Table time value. The end result is that under congestion, no cells are being scheduled for de-queuing into the future. Everything is being scheduled for immediate transmission, and all of the connections are waiting in FIFO Buffer 210.

If each VC connection had the same Max number, then each VC connection would have the same number of cells waiting in the FIFO Buffer 210. The result is that all connections receive effectively round robin service when the link is congested. Stated another way, every connection on the link receives a rate:

1/Num_Connections×Link_Rate

If each VC connection had the same communication rate, this result would be acceptable. Gateway system 10, however, will have to support many different cell transmission rates, all with different numbers of customer telecommunications devices. By implementing a Max parameter, higher rate connections may be permitted to have more cells in the FIFO Buffer 210 then slower connections. As a result, the higher bandwidth connections receive a rate:

Max_of the Fast_Connection/sum (Max's)×link BW

Context Logic 204 really consists of three separate processes. They are Cell En-queue, Cell De-queue and Context Clean up. The Cell En-queue process handles cell En-queue notifications from APC 92. The De-queue process handles de-queue notifications from APC 92. The Context Clean Up process looks for connections that have gone idle and resets their tables. Before these three functions are discussed in detail, the leaky bucket state must first be examined. Depending on the state of the connection, the state of the leaky bucket is updated at Cell En-queue and Cell De-queue events. The equation is as follows:

$Xnew = c = \max [Xold + T_{PCR}, t]$

X represents the leaky bucket state, c represents the conformance time sent to Calendar Table 206, $T_{PCR}$ is the period of the connection, and t is current time for Calendar Table 206. If a connection is conforming, Xnew will equal t. If a connection is non-conforming, Xnew will equal Xold+ TPCR. This is a basic single leaky bucket-shaping algorithm.

A dual leaky bucket-shaping algorithm is also possible and is given by the equations:

$c = \max [Xp\_old + T_{PCR}, Xs\_old + T_{SCR} - Bt, t]$ $Xp\_new = \max [Xp\_old + T_{PCR}, t]$ $Xs\_new = \max [Xs\_old + T_{SCR}, t]$ $Bt = (MBS - 1)(T_{SCR} - T_{PCR})$ Xp tracks the peak rate leaky bucket state, Xs tracks the sustained rate leaky bucket state, $T_{SCR}$ is the minimum sustained period, Bt is the burst tolerance, and MBS is the Maximum Burst Size.

A logic sequence for the leaky bucket would be:
Update:
  $Xnew = Xold + T_{PCR}$
  If (Xnew<=t)
    Xnew=t;
  Else
    Xnew=Xnew;
End Update;

In one embodiment of the present invention, t is represented by a finite number of bits. That means that time t will roll over. When t rolls over, the comparison of Xnew and t might show Xnew far into the future. Or, if the current time is close to roll over, then Xnew may cross the roll over boundary and appear far in the past.

A cell should only be scheduled a limited time into the future. Therefore, a limit can be set on the maximum $T_{PCR}$ (or minimum rate) that Calendar Table 206 will support. By considering a maximum $T_{PCR}$, the leaky bucket logic can be set to ignore X values that are too far into the future and refuse to accept X values that are too far into the past. Too far into the future would be any cell that has an Xnew>t+ slowest _connection. Too far into the past would be Xnew<t+3×Tslowest_connection.

Figure 12:
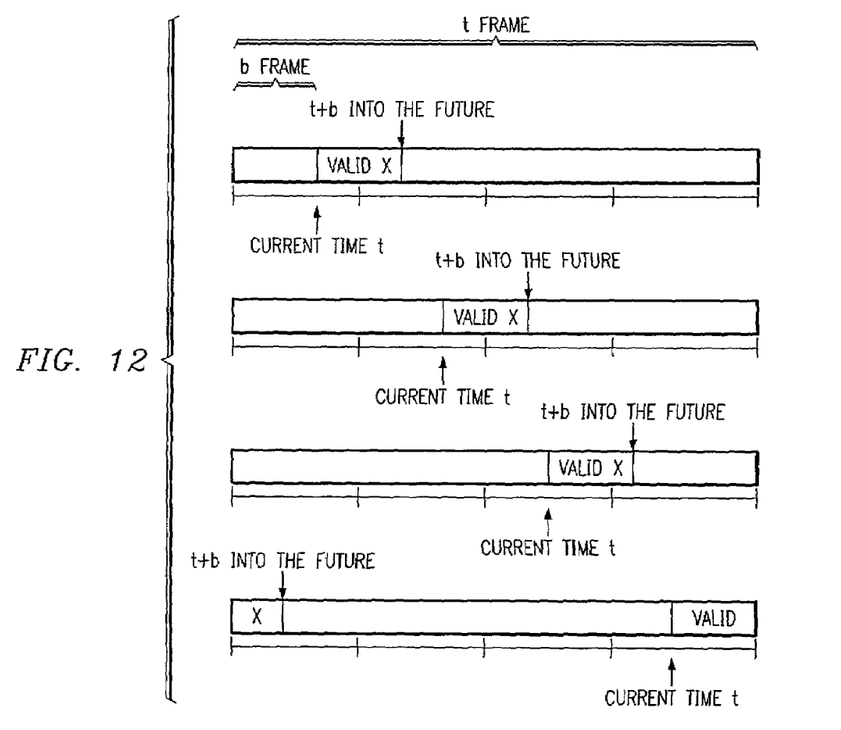

Referring now to FIG. 12, a Calendar Table 206 with a length of b seconds is illustrated for purposes of example. The slowest connection has a $T_{PCR}<b$. In this element, the time variable t is four times the size of b. When t reaches it's maximum value, it rolls over to zero. The time frame t consists of four b frames or time quadrants. A leaky bucket evaluation in the first, second, or third quadrants applies the logic:

If (Xnew<t) or (Xnew>t+b)
    Xnew=t

The first term detects X values that are excessively old. The second term detects X values that were left behind during a t roll over. In either event, X is old and needs to be pulled to the current value of time. In the fourth quadrant, it is possible for a cell to have been scheduled into the future and across the time roll over boundary. In this case there is a point where X can appear far enough into the past but still be valid. For the fourth quadrant, the following logic applies:

If (Xnew>t−3b) and (Xnew<t)
    Xnew=t;

The first comparison term allows a cell to be in the past (or actually validly into the future). The second term catches cells that are truly in the past.

The X update logic is given by:

```
Update:
    Xnew = Xold +T_PCR
    If (t < 3b)
        If (Xnew < = t) or (Xnew > t + b)
            Xnew = t;
        Else
            Xnew = Xnew;
    Else
        If (Xnew > t - 3b) and (Xnew < t)
            Xnew = t;
        Else
            Xnew = Xnew;
End Update;
```

When a cell is en-queued by APC 92, the following logic is executed

```
If (QLENGTH < = MAX)
    If (VCX [RESET] = = TRUE)
        VCX [X] = t;
        VCX [RESET] = FALSE;
    Update_X (VCX);
    Schedule Cell (VCX, SUBPORT, C);
    QLENGTH = QLENGTH +1;
Else
    QLENGTH = QLENGTH +1;
```

The Cell En-queue process is in charge of scheduling cells and updating the leaky bucket while the number of cells in Calendar Table 206 is less then Max. Once Max is reached, the Cell De-queue process takes over the scheduling process. The VCX [Reset] bit is set by Context Clean up logic.

Once the Cell En-queue process has scheduled all of the cells, it is allowed to schedule the Cell De-queue begins. When a cell is de-queued by APC 92, the following logic should be executed:

```
If (QLENGTH < = MAX)
    QLENGTH = QLENGTH - 1;
Else
    If (VCX [RESET] = = TRUE)
        VCX [X] = t;
        VCX [RESET] = FALSE;
    Update_X (VCX);
    Schedule Cell (VCX, SUBPORT, C);
    QLENGTH = QLENGTH - 1;
```

This is effectively the opposite of the en-queue process.

The Cell En-queue and Cell De-queue processes insure that X tracks along with time. If X falls behind before a time t roll over, the Update logic detects that the cell is too far into the future. If a connection has been idle for a long period of time, however, the X value will become stationary in time. Without a cell En-queue or cell De-queue, X will never get updated. If the connection becomes active and the Xnew value happens to appear valid, then the connection may need to unnecessarily wait until time equals Xnew. This can create an unnecessary fixed delay of $T_{PCR}$ for the connection.

The delay error is avoided by providing a Context Clean up process. The Context Clean up process searches through Context Table 202 looking for connections that have become idle. Context Table 202 flags an idle connection to have the X value reset to current time t. The Context Clean up should complete two searches of Context Table 202 before time rolls over. The logic is given by

```
While (TRUE)
    If (t < 3b)            // Is time in the first three
                           // quadrants?
        If (VCX [X] < = t) or (VCX [X] > t + b)
            VCX [RESET] = TRUE;
    Else
        If (VCX [X] > t - 3b) and (VCX [X] < t)
            VCX [RESET] = TRUE;
    VCX = VCX + 1;
```

As described above, the Context Table 202 maintains state information on each connection in Cell scheduler 102. The information Context Table includes:

$T_{PCR}$: The minimum period for the connection. ($1/T_{PCR}$ is the peak rate for the connection).

X: The current state of the leaky bucket. X points to a previous conformance time for the connection.

RESET: A flag to reset X to the current time on a Cell En-queue or Cell De-queue QLENGTH: The number of cells stored in the APC MAX: The maximum number of scheduled cells in Calendar Table 206 and FIFO Buffer 210.

Calendar Logic 208 consists of two processes: Calendar Schedule and Calendar Bin TX. The Calendar Schedule process is simply a response to a calendar schedule request from Context Logic 202. The Calendar Bin TX process moves conformant bins from Calendar Table 206 to the FIFO Logic 212.

The Calendar Schedule process is initiated by a calendar scheduler request from Context Logic 204. The Calendar Schedule process places a VCX in a calendar entry and appends the entry to the calendar bin in the subport calendar table specified by Context Logic 204. The parameters passed by the Calendar Logic are VCX, SUBPORT, and C (conformance time). For each tick of the Calendar Table clock, the Bin Transmit process hands the current conforming calendar bin to the FIFO Logic 212.

Calendar Table 206 is an array of dynamic linked lists. Each array entry is a conformance time. Any number of connections can be placed in the dynamic link list associated with a given array entry. Each array entry represents a finite amount of time. The total length of the Calendar Table array, b, multiplied by the amount of time per array, g, must be greater then the slowest connection (i.e. greater then the largest $T_{PCR}$).

The FIFO Logic 212 consists of two processes, FIFO Input and FIFO Output. The FIFO Input process responds to a FIFO append request from Calendar Logic 208. FIFO Buffer 210 receives a head and tail pointer to the conformant calendar bin. The FIFO Input process appends the calendar bin to the calendar in FIFO Buffer 210. The FIFO Output responds to requests from APC Interface 220 for a new VCX to transmit. The FIFO Buffer 210 is a single dynamic linked list of cells ready for transmission.

In one embodiment of the present invention, the ESI shaper implementation is operable to support an aggregate of 16000 connections. There are 3360 DS-0s on the TDM side of gateway system 10, and a worst-case over-subscription of gateway system 10 is assumed to be 10:1. This means gateway system 10 would be operable to service 33600 phone subscribers. If each phone subscriber had two phones per IAD 52, the max number of IADs 52 or VCs is 16800. For a binary multiple, this number of possible subscribers is rounded down to 32000.

All time variables in the Cell Scheduler 102 should have a resolution of at least one cell time at OC-12, i.e. 68 system clocks. This gives a smallest resolution of approximately 0.68 microseconds (µs).

In one embodiment the number of bins in Calendar Table 206 is 512. This is a somewhat arbitrary binary multiple, chosen for its proximity to the number of G.711 calls that can fit in a single DS-3. $T_{PCR}$, which represents the period of a downstream leg of a VC, may be set as follows:

$T_{PCR}$=round_down((1/PCR)/10.9 µs)

where PCR is the rate of the connection in cells per second and 10.9 µs is the number of OC-12 times per calendar bin. If the maximum $T_{PCR}$ is 5.5 ms (i.e a 44 byte G.711 call), then each bin must represent at least 10.7 µs (5.5 ms/512=10.7 µs). If the minimum time tick is 0.68 µs and each bin is 16 time ticks, then each bin represents 10.9 µs(0.68×16).

With a bin length of 10.9 µs, then

Tpcr_slowest=5.58 ms (10.9 µs×512), 179 cps or 76.0 kbps

Tpcr_fastest=10.9 µs (10.9 µs×1), 91.7 kcps or 38.9 Mbps

Without having to do any fractional math in hardware, this gives the following errors 1×G.711 call ($T_{PCR}$=504): 5.49 ms or approximately 0.2% beyond ideal 32×G.711 calls ($T_{PCR}$=15): 0.164 ms or approximately 5.0% beyond ideal Thus, while $T_{PCR}$ could be set to 0 to 511, this entire range is not necessary. On the low end, the fastest connection to support is 32 phones at 44 Byte G.711. The $T_{PCR}$ for this rate is about 15. On the high end, the slowest connection to support is 1 phone at 44 Bytes G.711. The $T_{PCR}$ for this rate is 503.

Because of the limited number of bins, higher rate connections start to lose accuracy. Depending on tolerance in the network, there is a limit on the peak rate that Calendar Table 206 can support. In addition it is possible to add bits to $T_{PCR}$ and X that track fractions of bins. When these additional bits are utilized along with a rounding function in Calendar Logic 208, improvements to long term accuracy may be achieved. All connections, however, may still be subject to an instantaneous jitter of 10.9 µs around the target $T_{PCR}$. With two additional bits on X, $T_{PCR}$, and t, this error could be reduced 32×G.711 calls ($T_{PCR}$=15.75)=0.172 ms or 0.0% error Each Calendar Table 206 has a calendar pointer. The calendar pointer for the different links increments independently of each other. The bin that the calendar pointer is pointing to represents current time. Time for Calendar Table 206 has a resolution of one bin. In one implementation time has a resolution of 10.9 µs. To represent the length of the table, the time parameter would need 9 bits. Time for Calendar Table 206 should be at least twice the amount of time it takes the Context Clean up process to pass through all of the 16000 connections at OC-12 (0.68 µs×16384=11.1 µs). So time should be 11 bits. ($2^{11}$×16=32768, where 32768 is twice the number of OC-12 times it takes to check 16000 connections). For a time parameter 11 bits long, time encompasses four Calendar Table roll overs before the time value itself rolls over.

A calendar bin requires a head and a tail pointer. The head pointer points to the first calendar bin entry. The tail pointer points to the last entry. In one embodiment each of these pointers is 16 bits wide, allowing them to point to 64000 entries. On a Quad DS-3 card, there are 4 links. Each link requires a Calendar Table 206 and each Calendar Table 206 is 512 bins long. Each calendar bin has 2 words, so the total space is 4096 words (4×512×2). For an Octal DS-3 card, there are 8 links requiring the storage space for 8192 words (8×512×2).

Each calendar entry contains two elements. One element is the specific VC that the entry represents. The second element is a pointer to the next calendar entry. Both of these values may be 16 bits, giving 64000 possible VCs and a 64k address space for calendar bin entries. There are a finite number of calendar bin entries. If all of the connections had a Max of 1, then the maximum number of entries would be the maximum number of connections, or 16000. Max, representing a portion of link bandwidth that a connection will receive under congestion, may be set as follows:

MAX=round_down (503/$T_{PCR}$)

Desirably, there are 32×16000 calendar bin entries in use. This would also mean that the system is over subscribed with voice by 320:1. A more realistic number puts the total number of possible subscribers at 33600. Since the number of active VCs was rounded down to 16000, the number of possible subscribers may also be rounded down to 32000. With 32000 simultaneous calendar bin entries and each entry containing 2 words, the total Calendar Entry RAM space is 64K words (32K×2).

$T_{PCR}$ is 9 bits. This allows $T_{PCR}$ to equal the total number of bins in Calendar Table 200. X may be 11 bits. This allows X to be directly comparable to time in Calendar Table 206. Reset is 1 bit. Qlength may be 8 bits. This allows an individual connection to have up to 256 cells of storage. For a 32 phone IAD 52, 256 cells provides approximately eight cells of storage. The maximum buffer threshold for the AAL-2 voice communication may be set lower. Max should be 6 bits. This allows a connection to have up to 32 cells in Calendar Table 206. VCs with 32×G.711 phones will get a Max value of 32. VCs with 1×G.711 phones will get a Max of 1. Given this number of bits, each context entry can be fit into a 3×16 table. Since there is space left over in the table, the following arrangement is envisioned as one embodiment:

Word 0: X:11 bits

Word 1: $T_{PCR}$: 9 bits

Word 2: Qlength: 8 bits, Max: 5 bits, Reset: 1 bit

This allows X and $T_{PCR}$ some additional space, if needed. Either Qlength or Max is allowed 2 bits of additional space, as well. At 16000 connections, Context Table 202 requires 48K words of RAM. If Context Table 202 was directly indexed by all 64000 VCXs, then 192K Words (64K×3) would be required. It is envisioned that additional RAM space, if required, could be obtained by adding 64K×1 words of space on a VCX to a Context Table decoupling lookup table. For the current 3 word configuration, this would save 144K Words ((64K×3 Words)−(64K×1 Words+16K×3 Words)).

In one embodiment of the present invention, the fastest that data can enter Cell Scheduler 102 is at an OC-12 rate. The fastest it can leave is at an OC-12 rate. It is desirable, therefore to complete operations in a single OC-12 time period. If gateway system 10 can maintain the OC-12 rate, logic can be staged out in a pipe line and all subports can share the same Context Table 202, Calendar Logic 206, and FIFO Logic 212. In spite of this, however, one Context Table 202 per link, one Calendar Table 206 per link, and one FIFO Buffer 210 per link will still be required because ports cannot share these entities.

Figure 13:
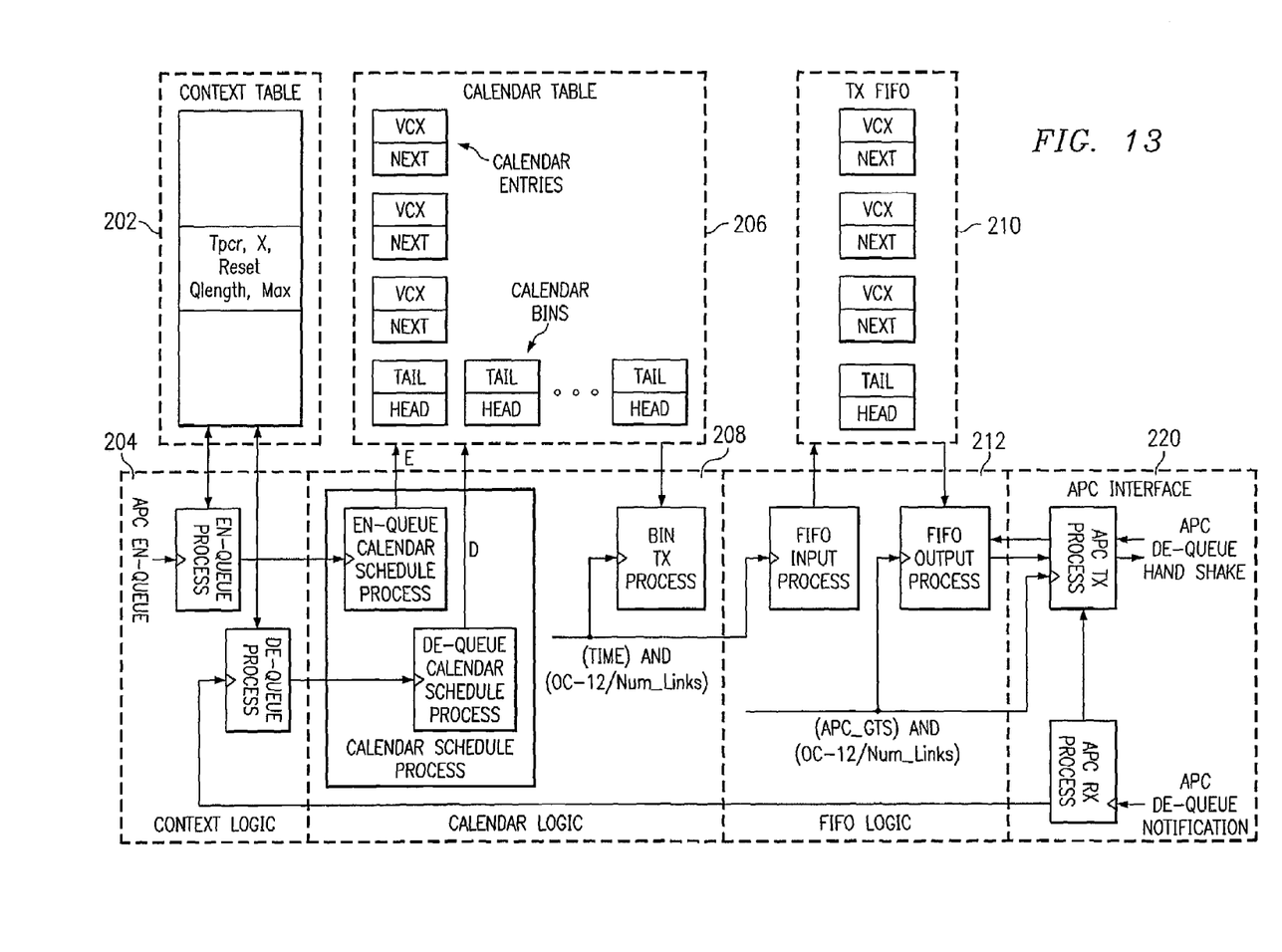

Referring now to FIG. 13, there is illustrated a block diagram for the logic processes. Within an OC-12 network, each of the processes occurs and each process is independent of each other within an OC-12 time period.

Figure 14:
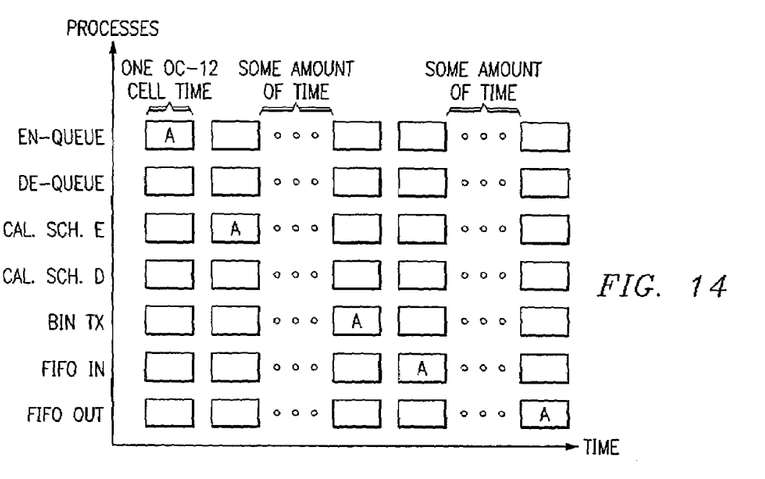

Context Logic
One Cell En-queue
One Cell De-queue
Context Clean up on at least one entry
Calendar Schedule
One Calendar Schedule for En-queue
One Calendar Schedule for De-queue
One Bin Transmit request
FIFO Buffer
One FIFO Input
One FIFO Output Referring now to FIG. 14, there is illustrated a VCX propagating through ESI Scheduler 102. Successive operations on the same cell across multiple OC-12 cycles include Thread One: Event driven
Cell En-queue
Calendar Scheduler for En-queue
Thread Two: Event Driven
Cell De-queue
Calendar Scheduler for De-queue
Thread Three: Link Time Driven
Bin Transmit
FIFO Input
FIFO Output
Thread Four: OC-12 Time Driven
Context Clean up Although various embodiments of the present invention have been described, myriad changes and variations may be made with equal effectiveness. For example in an illustrated embodiment the modules and components depicted within system 10 represent functional elements that are reasonably self-contained so that each can be designed, constructed, and updated substantially independently of the others. In a particular embodiment some or all of those modules and components are implemented on separate printed circuit boards that may be coupled to a backplane in a chassis. In alternative embodiments, however, system 10 may include different hardware, software, or combinations of hardware and software for providing the functionality described and illustrated in this application. Other examples may be readily ascertainable by those skilled in the art and may be made herein without departing from the spirit and scope of the present invention as defined by the following claims.

What is claimed is:

1. A method for cross connecting an Asynchronous Transfer Mode (ATM) network and a telecommunication switch, comprising:
receiving ATM cells from the ATM network at a packet sorter;
extracting data packets from the ATM cells, wherein the data packets comprise address data and payload data;
generating translated addresses based on the address data;
creating new data packets based on the payload data and the translated addresses;
creating new ATM cells with the new data packets;
scheduling the new ATM cells to be transmitted from the packet sorter to an ATM switch;
transmitting the new ATM cells from the packet sorter to an ATM switch in compliance with an ATM service contract;
forwarding the new ATM cells from the ATM switch to at least one distributed Segmentation and Reassembly (SAR);
converting the new ATM cells to Time-Division Multiplexed (TDM) signals; and
transmitting the TDM signals from the at least one distributed SAR to the telecommunication switch via at least one TDM port.

2. The method of claim 1, wherein translated addresses are generated based on the address data and a lookup table.

3. The method of claim 2, wherein the lookup table is stored in a RAM memory.

4. The method of claim 1, wherein scheduling the new ATM cells to be transmitted from the packet sorter to an ATM switch comprises queuing the new ATM cells in a Buffer.

5. The method of claim 4, wherein scheduling the new ATM cells to be transmitted from the packet sorter to an ATM switch further comprises using an algorithm to schedule when to transmit the new ATM cells.

6. The method of claim 1, wherein the ATM service contract comprises an ATM Peak Cell Rate.

7. The method of claim 1, further comprising measuring the time required to fill an ATM cell with data packets and filling the rest of the ATM cell payload with zeroes and transmitting the upon the expiration of a predetermined time period.

8. The method of claim 1, wherein the at least one distributed SAR is associated with the at least one corresponding TDM port.

9. A method for cross connecting an Asynchronous Transfer Mode (ATM) network and a telecommunication switch, comprising:
receiving incoming Time-Division Multiplexed (TDM) signals from at least one TDM port at least one distributed Segmentation and Reassembly (SAR);
converting the incoming TDM signals into incoming ATM cells;
forwarding the incoming ATM cells from at least one distributed SAR to an ATM switch;
transmitting the incoming ATM cells from the ATM switch to a packet sorter;
extracting data packets from the incoming ATM cells, wherein the data packets comprise incoming address data and incoming payload data;
generating translated incoming addresses, based on the incoming address data;
creating new incoming data packets, based on the incoming payload data and the translated incoming addresses;
creating new incoming ATM cells with the new incoming data packets;
scheduling the new incoming ATM cells to be transmitted to an Integrated Access Device (IAD) across the ATM network; and
transmitting the new incoming ATM cells to the Integrated Access Device (IAD) across the ATM network in compliance with an ATM service contract.

10. The method of claim 9, wherein translated incoming addresses are generated based on the incoming address data and a lookup table.

11. The method of claim 10, wherein the lookup table is stored in a RAM memory.

12. The method of claim 9, wherein scheduling the new incoming ATM cells to be transmitted to the ATM network comprises queuing the ATM cells in a buffer.

13. The method of claim 12, wherein scheduling the new incoming ATM cells to be transmitted to the ATM network further comprises using an algorithm to schedule when to transmit the new incoming ATM cells.

14. The method of claim 9, wherein the ATM service contract comprises an ATM Peak Cell Rate.

15. The method of claim 9, further comprising measuring the time required to fill an ATM cell with data packets and filling the rest of the ATM cell payload with zeroes and transmitting the cell upon the expiration of a predetermined time period.

16. The method of claim 9, wherein the at least one distributed SAR is associated with the at least one corresponding TDM port.

17. A system for cross connecting an Asynchronous Transfer Mode (ATM) network and a telecommunication switch, comprising:
- an Integrated Access Device (IAD) to receive an ATM cell, extract at least one data packet comprising address data and payload data from the ATM cell, generate a translated address based on the address data, create at least one new data packet based on the payload data and the translated address, and create a new ATM cell with the new data packet;
- a buffer manager to determine if there is adequate space to store the new ATM cell in a buffer and further to store the new ATM cell in the buffer upon a determination by the buffer manager that there is adequate storage space;
- a scheduler to issue a command to retrieve a cell from the buffer to schedule the retrieved cell to be transmitted over the ATM network; and
- the IAD further to transmit the ATM cell to an ATM switch in compliance with an ATM service contract;
- the ATM switch to forward the new ATM cells to at least one distributed Segmentation and Reassembly (SAR);
- the at least one SAR to convert the new ATM cell to a Time-Division Multiplexed (TDM) signal and transmit the TDM signal from the at least one distributed SAR to the telecommunication switch via at least one TDM port.

18. A system for cross connecting an Asynchronous Transfer Mode (ATM) network and a telecommunication switch, comprising:
- at least one distributed Segmentation and Reassembly (SAR) to receive incoming Time-Division Multiplexed (TDM) signals from at least one TDM port, convert the incoming TDM signals into incoming ATM cells, and forward the incoming ATM cells from the at least one distributed SAR to an ATM switch;
- the ATM switch operable to transmit a incoming ATM cells from the ATM switch to the packet sorter;
- the packet sorter to extract data packets comprising incoming address data and incoming payload data from the incoming ATM cells, generate translated incoming addresses based on the incoming address data, create new incoming data packets based on the incoming payload data and the translated incoming addresses, and create new incoming ATM cells with the new incoming data packets;
- a scheduler to schedule the new incoming ATM cells to be transmitted to an Integrated Access Device (IAD) over the ATM network; and
- the packet sorter further to transmit the new incoming ATM cells to the IAD over the ATM network in compliance with an ATM service contract.

* * * * *